(12) United States Patent
Shao et al.

(10) Patent No.: US 11,527,241 B2
(45) Date of Patent: Dec. 13, 2022

(54) DISPLAY DEVICE AND METHOD FOR CONTROLLING THE SAME

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiyang Shao, Beijing (CN); Yuxin Bi, Beijing (CN); Jian Sun, Beijing (CN); Hao Zhang, Beijing (CN)

(73) Assignees: BEIJING BOE OPTOELECTRONICS TECHNOLOGY CO., LTD., Beijing (CN); Beijing BOE Technology Development Co., Ltd., Beijing (CN)

(*) Notice: Subject to any disclaimer, the term of this patent is extended or adjusted under 35 U.S.C. 154(b) by 194 days.

(21) Appl. No.: 16/599,947

(22) Filed: Oct. 11, 2019

(65) Prior Publication Data
US 2020/0118565 A1    Apr. 16, 2020

(30) Foreign Application Priority Data

Oct. 12, 2018  (CN) .......................... 201811188582.5

(51) Int. Cl.
*G10L 15/22*     (2006.01)
*G10L 15/26*     (2006.01)

(52) U.S. Cl.
CPC .............. *G10L 15/22* (2013.01); *G10L 15/26* (2013.01)

(58) Field of Classification Search
CPC ......... G10L 15/22; G10L 15/26; G10L 17/00; G10L 17/08; G10L 2015/088;
(Continued)

(56) References Cited

U.S. PATENT DOCUMENTS

2001/0000534 A1*  4/2001  Matulich ................. G10L 15/26
                                                                    704/E15.045
2012/0326852 A1* 12/2012  Harris .................... G08C 17/02
                                                                    340/12.54
(Continued)

FOREIGN PATENT DOCUMENTS

| CN | 108196777 A | 6/2018 |
|----|-------------|--------|
| CN | 108399918 A | 8/2018 |
| CN | 108572777 A | 9/2018 |

OTHER PUBLICATIONS

First Office Action dated Mar. 12, 2020 corresponding to Chinese application No. 201811188582.5.

*Primary Examiner* — Angela A Armstrong
(74) *Attorney, Agent, or Firm* — Nath, Goldberg & Meyer; Joshua B. Goldberg

(57) ABSTRACT

A display device and a method for controlling the same are provided. The display device includes a rollable display screen, a voice acquisition unit, an identification control unit, a drive control unit and a display control unit. The voice acquisition unit is configured to acquire a first voice command. The identification control unit is configured to identify the first voice command acquired by the voice acquisition unit as a voice process command, and the voice process command includes a rolling operation command and a display drive command. The drive control unit is configured to perform an operation corresponding to the rolling operation command on the rollable display screen according to the rolling operation command. The display control unit is configured to control a display state of the rollable display screen according to the display drive command.

18 Claims, 5 Drawing Sheets

(58) Field of Classification Search
CPC .............. G10L 2015/223; G09F 9/301; H04M 1/0268; H04M 1/72563
See application file for complete search history.

(56) References Cited

U.S. PATENT DOCUMENTS

| | | | |
|---|---|---|---|
| 2013/0325484 A1* | 12/2013 | Chakladar | G10L 15/22 704/275 |
| 2017/0160819 A1 | 6/2017 | Yi et al. | |
| 2018/0217679 A1* | 8/2018 | Kwon | G06F 3/0484 |
| 2018/0342225 A1* | 11/2018 | Yun | G06F 3/167 |
| 2019/0146557 A1* | 5/2019 | Choi | G09F 9/301 361/749 |
| 2020/0302313 A1* | 9/2020 | Jeong | G10L 15/08 |

* cited by examiner

DISPLAY DEVICE AND METHOD FOR CONTROLLING THE SAME

CROSS-REFERENCE TO RELATED APPLICATIONS

The present application claims the priority of Chinese Patent Application No. 201811188582.5, filed on Oct. 12, 2018, the contents of which are incorporated herein in their entirety by reference.

TECHNICAL FIELD

The present disclosure relates to the field of display technology, and in particular, relates to a display device and a method for controlling a display device.

BACKGROUND

Nowadays, flexible display devices or rollable display devices have become a hotspot in the industry. In the related art, some rollable display screens are mechanically operated to be rolled, while other rollable display screens are unlocked by a fingerprint to be rolled. It is desirable to achieve intelligent switching between display states and/or rolled states of rollable display devices having various sizes.

SUMMARY

An aspect of the present disclosure provides a display device including a rollable display screen, a voice acquisition unit, an identification control unit, a drive control unit and a display control unit, wherein the voice acquisition unit is configured to acquire a first voice command;

the identification control unit is configured to identify the first voice command acquired by the voice acquisition unit as a voice process command, and the voice process command includes a rolling operation command and a display drive command;

the drive control unit is configured to perform an operation corresponding to the rolling operation command on the rollable display screen according to the rolling operation command; and the display control unit is configured to control a display state of the rollable display screen according to the display drive command.

In an embodiment, the identification control unit is further configured to receive state feedback information sent from the rollable display screen, the state feedback information includes a current rolled state and a current display state of the rollable display screen, and the identification control unit is further configured to store the current rolled state and the current display state of the rollable display screen in a memory.

In an embodiment, the display device further includes a voice prompt unit, wherein the voice acquisition unit is further configured to acquire a second voice command;

the identification control unit is further configured to identify the second voice command acquired by the voice acquisition unit as a voice wake-up command, and read the current rolled state and the current display state of the rollable display screen according to the voice wake-up command; and the voice prompt unit is configured to output a voice prompt according to the read current rolled state and the read current display state of the rollable display screen, for a user outputting the first voice command according to the voice prompt.

In an embodiment, the identification control unit is further configured to extract voiceprint information from the second voice command acquired by the voice acquisition unit by using a voiceprint recognition technology, compare the extracted voiceprint information with a prestored voiceprint information to obtain a comparison result, and identify the second voice command acquired by the voice acquisition unit as the voice wake-up command if the comparison result indicates that the extracted voiceprint information is the same as the prestored voiceprint information.

In an embodiment, the rolling operation command includes a completely rolling command, a completely expanding command or a partially expanding command.

In an embodiment, the display drive command includes a turn-off command, a turn-on command or a standby command.

In an embodiment, the display device further includes a voice capture unit configured to capture the first voice command, and send the first voice command to the voice acquisition unit.

In an embodiment, the display device further includes a voice capture unit configured to capture the second voice command, and send the second voice command to the voice acquisition unit.

In an embodiment, the display device further includes an accommodation structure, and the voice capture unit is located on a bottom or an outer side wall of the accommodation structure.

In an embodiment, the voice acquisition unit is configured to acquire the first voice command from the voice capture unit, and the voice capture unit is located in a terminal device.

In an embodiment, the voice acquisition unit is configured to acquire the second voice command from the voice capture unit, and the voice capture unit is located in a terminal device.

In an embodiment, the display device further includes an accommodation structure, and the identification control unit, the drive control unit and the display control unit are located within the accommodation structure.

Another aspect of the present disclosure provides a method for controlling a display device, the display device including a rollable display screen, and the method including a step S01 of acquiring a first voice command;

a step S02 of identifying the acquired first voice command as a voice process command, wherein the voice process command includes a rolling operation command and a display drive command;

a step S03 of performing an operation corresponding to the rolling operation command on the rollable display screen according to the rolling operation command; and a step S04 of controlling a display state of the rollable display screen according to the display drive command.

In an embodiment, the method further includes a step S05 of acquiring a second voice command; and a step S06 of extracting voiceprint information from the acquired second voice command by using a voiceprint recognition technology;

wherein the step S05 and the step S06 are prior to the step S01.

In an embodiment, the method further includes a step S07 of comparing the extracted voiceprint information with a prestored voiceprint information to obtain a comparison result; and a step S08 of outputting an authentication failure prompt if the comparison result indicates that the extracted voiceprint information is not the same as the prestored voiceprint information.

In an embodiment, the method further includes a step S09 of identifying the acquired second voice command as a voice wake-up command if the comparison indicates that the extracted voiceprint information is the same as the prestored voiceprint information.

In an embodiment, the method further includes a step S10 of reading a current rolled state and a current display state of the rollable display screen according to the voice wake-up command.

In an embodiment, the method further includes a step S11 of outputting a voice prompt according to the current rolled state and the current display state of the rollable display screen, for a user outputting the first voice command according to the voice prompt.

In an embodiment, the method further includes a step S12 of receiving state feedback information sent from the rollable display screen, wherein the state feedback information includes a current rolled state and a current display state of the rollable display screen;

wherein the step S12 is after the step 04.

In an embodiment, the method further includes a step S13 of storing the current rolled state and the current display state of the rollable display screen.

DETAILED DESCRIPTION

To enable one of ordinary skill in the art to better understand technical solutions of the present disclosure, a display device and a method for controlling the display device provided by exemplary embodiments of the present disclosure will be described in detail below with reference to the accompanying drawings.

The inventors of the present inventive concept found that, in a case where a rollable display screen of a rollable display device is rolled and expanded only by mechanical operations, it is impossible to intelligently switch between states of the rollable display device, and thus the user experience thereof is poor. In a case where a rollable display screen of a rollable display device is unlocked by a fingerprint to be rolled or expanded, a user needs to touch the rollable display device, which will cause inconvenience for a rollable display device (e.g., a television) having a medium to large size or installed in an unreachable position. Therefore, it is desirable to achieve intelligent switching between display states and/or rolled states of the rollable display device, so as to improve the space utilization and user experience of the rollable display screen of the rollable display device, and improve the product value of the rollable display device.

Figure 1:
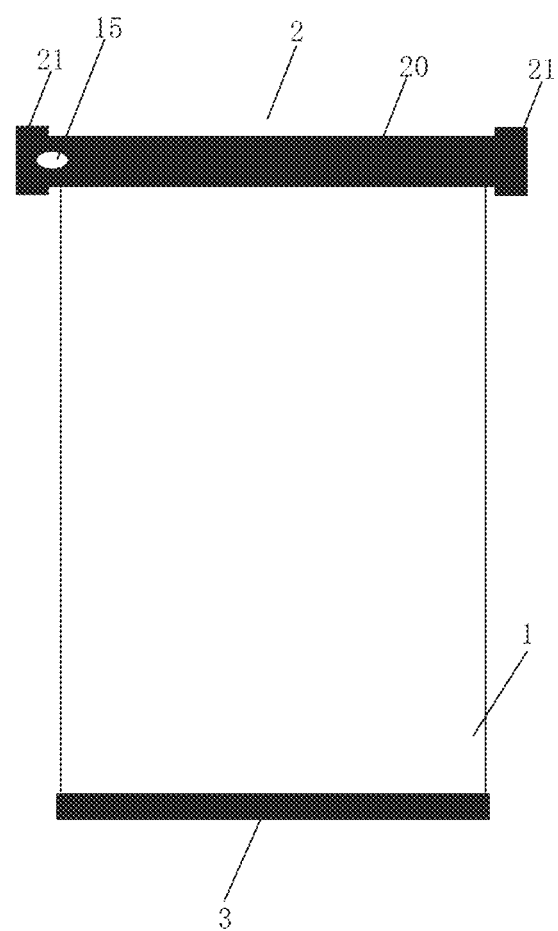
FIG. 1 is a schematic diagram showing a structure of a display device according to an embodiment of the present disclosure.
Figure 2:
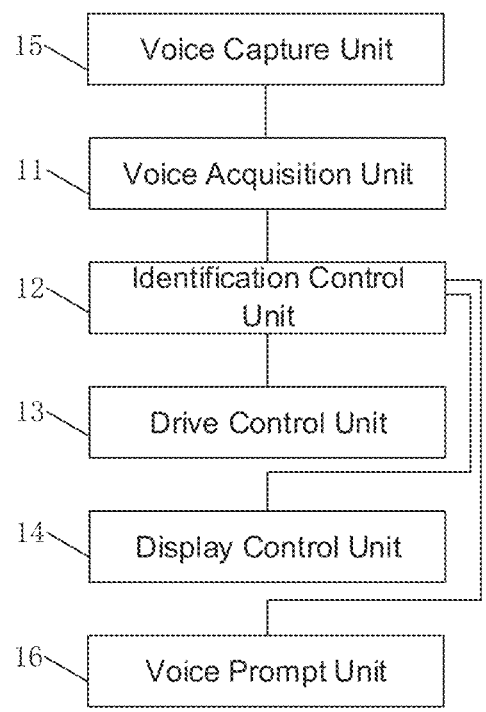
FIG. 2 is a schematic diagram showing a functional structure of a control device of the display device shown in FIG. 1.
Figure 3:
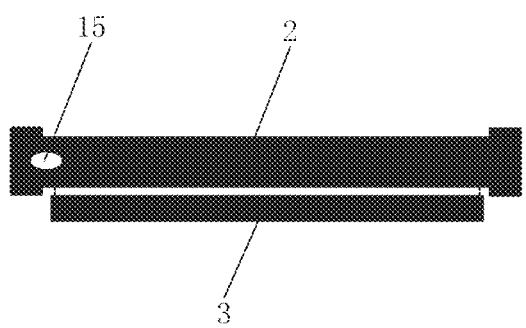
FIG. 3 is a schematic diagram showing a structural state of a rollable display screen of the display device shown in FIG. 1.
Figure 4:
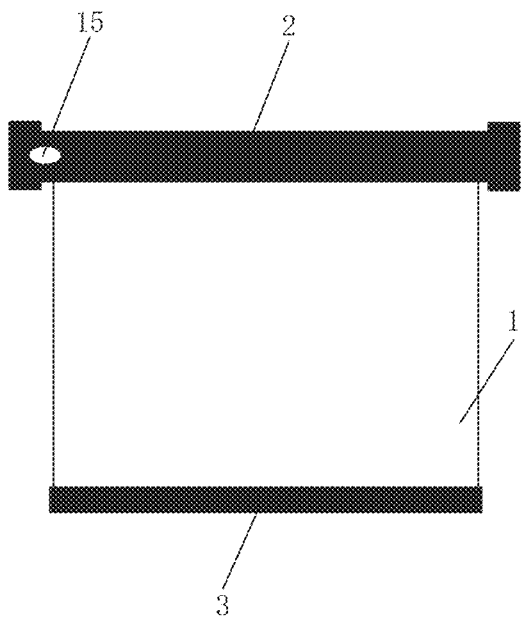
FIG. 4 is a schematic diagram showing another structural state of the rollable display screen of the display device shown in FIG. 1.
Figure 5:
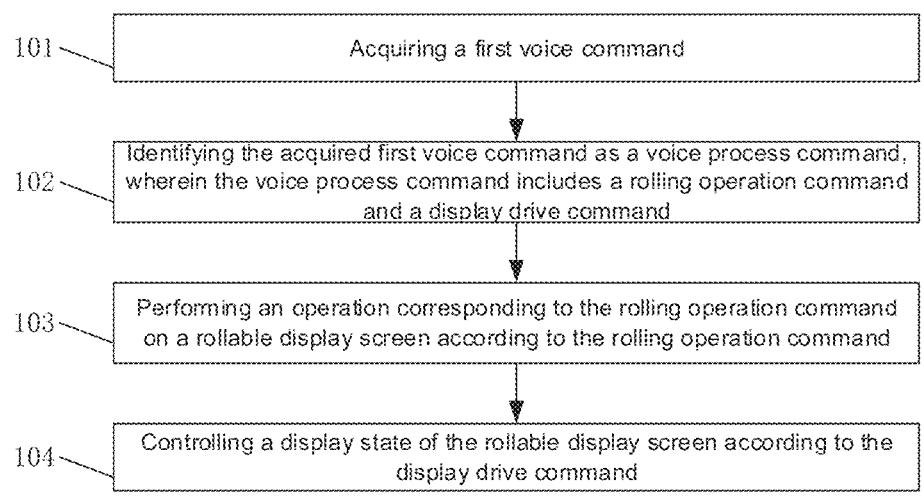
FIG. 5 is a schematic flowchart showing a method for controlling a display device according to an embodiment of the present disclosure.
Figure 6:
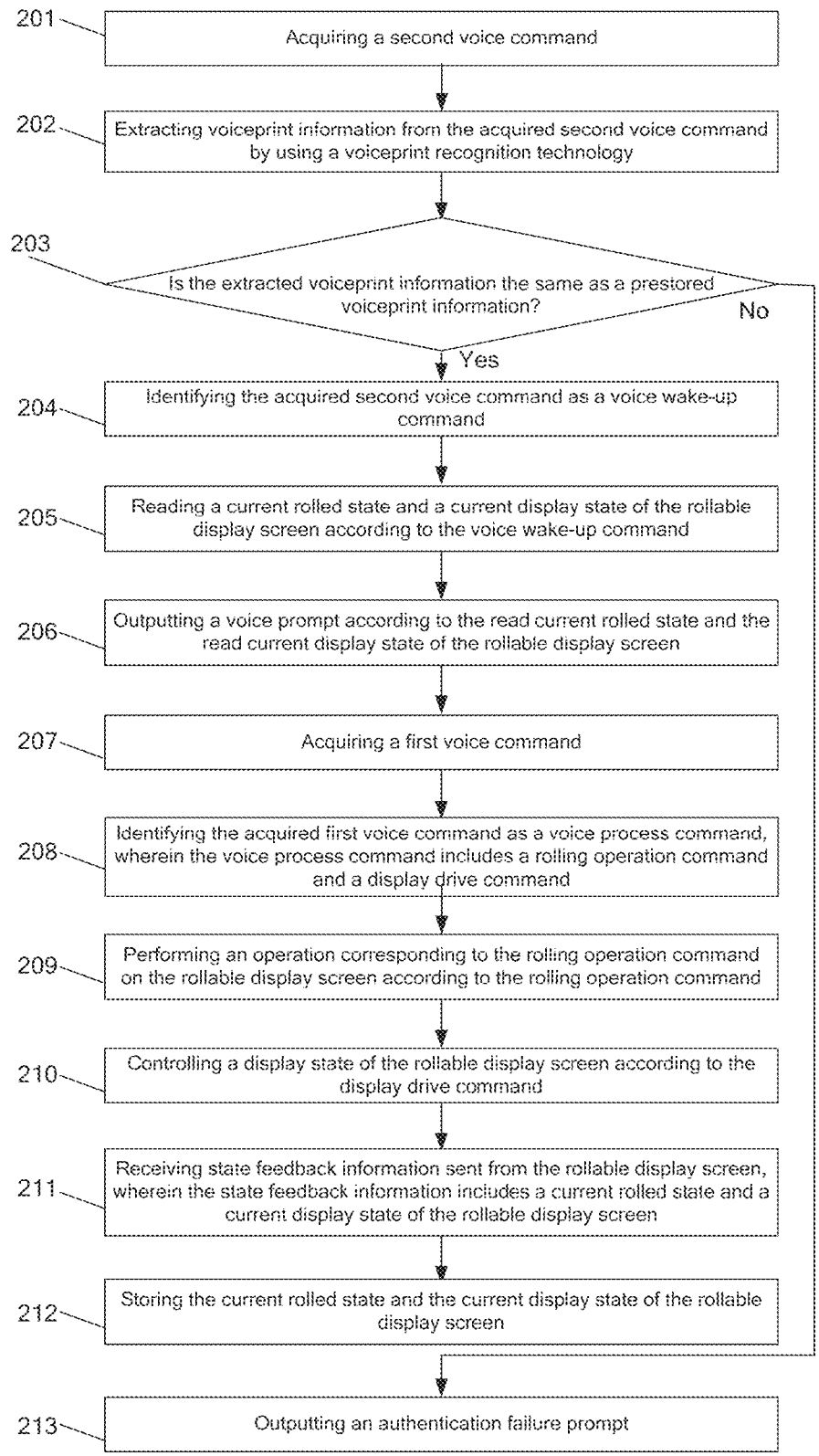
FIG. 6 is a schematic flowchart showing a method for controlling a display device according to an embodiment of the present disclosure.
Figure 7:
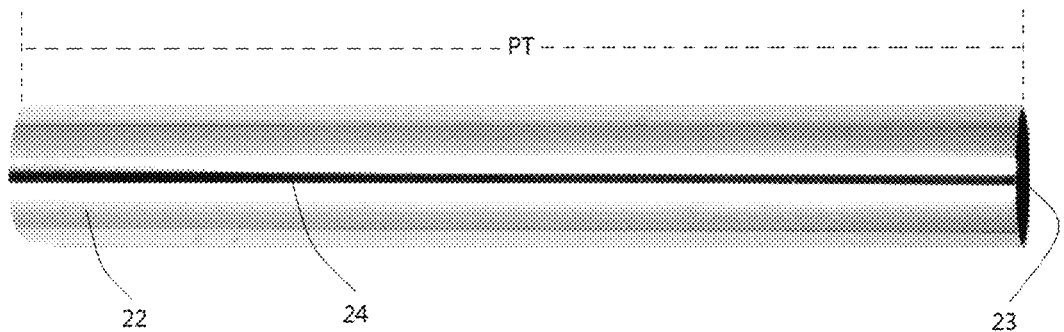
FIG. 7 is a schematic enlarged diagram showing a portion of a casing of an accommodation structure of the display device shown in FIG. 1.

FIG. 1 is a schematic diagram showing a structure of a rollable display device according to an embodiment of the present disclosure, and FIG. 2 is a schematic diagram showing a functional structure of a control device of the rollable display device shown in FIG. 1. FIG. 3 is a schematic diagram showing a structural state of a rollable display screen of the rollable display device shown in FIG. 1, and FIG. 4 is a schematic diagram showing another structural state of the rollable display screen of the rollable display device shown in FIG. 1. FIG. 5 is a schematic flowchart showing a method for controlling a rollable display device according to an embodiment of the present disclosure, and FIG. 6 is a schematic flowchart showing a method for controlling a rollable display device according to an embodiment of the present disclosure. FIG. 7 is a schematic enlarged diagram showing a portion PT of a casing 20 of an accommodation structure 2 of the rollable display device shown in FIG. 1; and FIG. 8 is a schematic diagram showing various components within the accommodation structure 2 of the rollable display device shown in FIG. 1.

Figure 8:
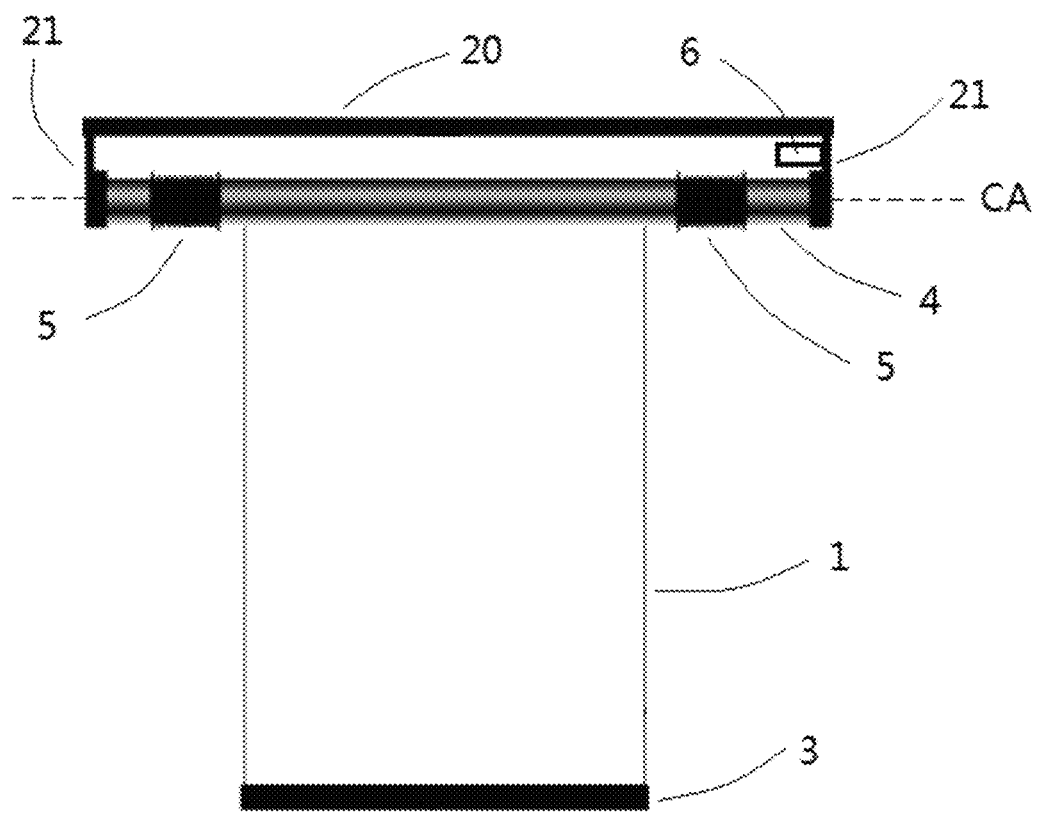
FIG. 8 is a schematic diagram showing various components within the accommodation structure of the display device shown in FIG. 1.

As shown in FIGS. 1, 7 and 8, a rollable display device (hereinafter "display device" for brevity) according to some embodiments of the present disclosure may include a rollable display screen 1, an accommodation structure 2, a fixing bar 3, a rotation shaft 4, at least one motor 5, and a mainboard (e.g., a printed circuit board) 6. The rollable display screen 1 may be a flexible display screen, and may be rolled into a scroll. The accommodation structure 2 may have an overall structure of substantially a cuboid, a cylinder, or the like. The accommodation structure 2 may include a casing 20 that is hollowed-out and two bottoms 21. One or both of the two bottoms 21 may be detachably connected to the casing 20 (e.g., through screw threads, or through a snap and a slot), which facilitates installation and maintenance. The casing 20 may include an outer side wall 22 and an inner side wall 23, an opening (e.g., a strip-shaped opening) 24 may be formed in the outer side wall 22 of the casing 20. The rotation shaft 4 is located within the accommodation structure 2 (or within the casing 20), and both ends of the rotation shaft 4 are fixed on the two bottoms 21, respectively. A central axis CA of the rotation shaft 4 may pass through center points of the two bottoms 21. One end of the rollable display screen 1 may pass through the opening 24 and be connected to the rotation shaft 4, and the other end of the rollable display screen 1 may be connected to the fixing bar 3. The fixing bar 3 may prevent the end of the rollable display screen 1 connected to the fixing bar 3 being completely located within the accommodation structure 2 (or the casing 20) and being far away from the opening 24. Each of the at least one motor 5 may be a micro motor, a tubular motor, or the like, and may be connected to the rotation shaft 4. Each motor 5 may be connected to an identification control unit 12 as shown in FIG. 2, and may drive the rotation shaft 4 to rotate clockwise or counterclockwise upon receiving a control signal from the identification control unit 12. For example, clockwise rotation of the rotation shaft 4 may cause the rollable display screen 1 to be rolled, while counterclockwise rotation of the rotation shaft 4 may cause the rollable display screen 1 to be expanded. The mainboard 6 may be located on the accommodation structure 2, for example, may be located on one of the bottoms 21. A voice acquisition unit 11, an identification control unit 12, a drive control unit 13, a display control unit 14, and a voice prompt unit 16 shown in FIG. 2 may be located on the mainboard 6. Alternatively, the voice acquisition unit 11, the identification control unit 12, the drive control unit 13, and the display control unit 14 shown in FIG. 2 may be located on the mainboard 6, while the voice prompt unit 16 shown in FIG. 2 may be located on the accommodation structure 2, for example, on one of the bottoms 21.

In other words, in an embodiment, as shown in FIGS. 1 and 2, the display device may include the rollable display screen 1, the voice acquisition unit 11, the identification control unit 12, the drive control unit 13, and the display control unit 14. The voice acquisition unit 11 may be connected to the identification control unit 12, and the identification control unit 12 may be connected to the drive control unit 13 and the display control unit 14. In an embodiment, the voice acquisition unit 11 may be an application processor (AP), an application specific integrated circuit (ASIC), or the like. The identification control unit 12 may be a main chip controlling the overall display device, and may be the AP, a field programmable gate array (FPGA), or a chip having the corresponding functions. The drive control unit 13 may include the AP and/or the at least one motor 5. The display control unit 14 may be the AP, the FPGA, or a chip having the corresponding functions.

For example, the display device may further include a memory (e.g., a non-volatile memory), and the memory may be connected to the voice acquisition unit 11, the identification control unit 12, the drive control unit 13, and/or the display control unit 14. The memory may have prestored first voice commands therein. The voice acquisition unit 11 may acquire at least one first voice command. The identification control unit 12 may identify each first voice command acquired by the voice acquisition unit 11 as a voice process command, and the voice process command may include a rolling operation command and a display drive command. The drive control unit 13 may perform an operation (e.g., a rolling operation or an expanding operation) corresponding to the rolling operation command on the rollable display screen 1, according to the rolling operation command. The display control unit 14 may control a display state of the rollable display screen 1 according to the display drive command.

In the present embodiment, the display device may further include the accommodation structure 2. FIG. 1 shows a structural state of the rollable display screen 1, for example, a completely expanded state of the rollable display screen 1. As shown in FIG. 1, the rollable display screen 1 may be a flexible display screen, and may be rolled to be located within the accommodation structure 2. In other words, the accommodation structure 2 may accommodate the rollable display screen 1 when the rollable display screen 1 is rolled (e.g., completely rolled). The overall shape of the accommodation structure 2 may include a cube or a cylinder. The rollable display screen 1 may display an image.

In an embodiment, the display device may further include a voice capture unit 15 that may be connected to the voice acquisition unit 11. The voice capture unit 15 may capture a first voice command in real time, and send the first voice command to the voice acquisition unit 11. The voice capture unit 15 may be located on the accommodation structure 2, for example, may be located on the outer side wall 22 or one of the bottoms 21 of the accommodation structure 2. The voice capture unit 15 may have a small volume for ease installation, and thus an installation of the voice capture unit 15 may be selected easily. In a practical application, the voice capture unit 15 may also be provided at any other position, as long as the voice capture unit 15 can capture various voice commands. For example, the voice capture unit 15 may include a microphone. In a practical application, the voice capture unit 15 may be other sound collection devices that are not listed here. The voice capture unit 15 may be connected to the voice acquisition unit 11 via a connection line. The voice capture unit 15 in the present embodiment captures voices in a contactless manner, which makes capturing of voices simple and convenient.

In a practical application, the voice capture unit 15 may also be provided outside the display device, for example, may be provided in a terminal device which is different from the display device. For example, the terminal device may be a mobile phone, a tablet, or a computer. In this case, the voice acquisition unit 11 may acquire the first voice command from the voice capture unit 15. The voice capture unit 15 may capture a first voice command, and send the first voice command to the voice acquisition unit 11. For example, the voice capture unit 15 may send the first voice command to the voice acquisition unit 11 by using a far field communication technology or a near field communication technology.

In the present embodiment, as described above, the identification control unit 12, the drive control unit 13 and the display control unit 14 may be located inside the accommodation structure 2. However, the present disclosure is not limited thereto. For example, each of the identification control unit 12, the drive control unit 13 and the display control unit 14 may be located on the inner side wall 23 or the outer side wall 22 of the accommodation structure 2. It should be noted that in the present embodiment, the identification control unit 12, the drive control unit 13 and the display control unit 14 are located inside of the accommodation structure 2, and thus are not shown in FIG. 1.

As described above, the display device may further include the fixing bar 3. The fixing bar 3 is located at the end of the rollable display screen 1 distal to the accommodation structure 2, i.e., the fixing bar 3 is located at a distal end of the rollable display screen 1. The fixing bar 3 may also fix the rollable display screen 1 in a case where the rollable display screen 1 is in a completely expanded state or a partially expanded state.

In the present embodiment, the voice capture unit 15 may capture a first voice signal, and perform an acoustic and electrical conversion and a conditioning sampling on the first voice signal to generate a first voice command, and sent the first voice command to the voice acquisition unit 11. The first voice command may be a voice pulse sequence (i.e., a digital signal).

In the present embodiment, after receiving the first voice command output from the voice acquisition unit 11, the identification control unit 12 may perform speech recognition on the first voice command to identify specific content of the first voice command. The identification control unit 12 may compare the first voice command with a voice template command in a pre-constructed (e.g., prestored in the memory) voice template database to obtain a comparison result, and identify the first voice command as a voice process command if the comparison result indicates that the first voice command is the same as the voice template command in the voice template database. For example, the voice template command may include a rolling operation template command and a display drive template command, and the voice process command may include a rolling operation command and a display drive command. The identification control unit 12 may further trigger the voice acquisition unit 11 to continue the operation of acquiring a first voice command, if the comparison result indicates that the first voice command is not the same as the voice template command stored in the voice template database. For example, before identifying the first voice command, the identification control unit 12 may further filter the first voice command to remove interference and extract an eigenvector from the first voice command, so as to obtain a standard eigenvector (e.g., an eigenvector that is a unit vector). Thereafter, the identification control unit 12 compares the standard eigenvector with the voice template command stored in the pre-constructed voice template database.

In the present embodiment, the voice acquisition unit 11 may further acquire a second voice command. The identification control unit 12 may further identify the second voice command acquired by the voice acquisition unit 11 as a voice wake-up command, and read a current rolled state and a current display state of the rollable display screen 1 according to the voice wake-up command. The display device may further include a voice prompt unit 16, and the voice prompt unit 16 may be connected to the identification control unit 12. The voice prompt unit 16 may output a voice prompt according to the read current rolled state and/or the read current display state of the rollable display screen 1, for a user outputting a first voice command according to the voice prompt. For example, the voice prompt may include a prompt informing the current rolled state and the current display state of the rollable display screen 1 to the user. The voice prompt unit 16 may include a digital to analog converter (DAC) and a speaker. The voice prompt unit 16 may receive a source file of the voice prompt, perform a digital to analog conversion and a signal amplification on the source file of the voice prompt to form the voice prompt, and output the voice prompt. In the present embodiment, the voice wake-up command may wake up the rollable display screen 1 in a case where the rollable display screen 1 is in a turn-off state. The rollable display screen 1 is in a standby state after being waked up, and waits for a first voice command output from a user. At this time, the display device may output the voice prompt to the user first, and the voice prompt may remind the user to output a first voice command.

In the present embodiment, the voice capture unit 15 may further capture a second voice signal, perform an acoustic and electrical conversion and a conditioning sampling on the second voice signal to form a second voice command, and send the second voice command to the voice acquisition unit 11. The second voice command may be a voice pulse sequence (i.e., a digital signal). The voice capture unit 15 may capture the second voice command, and send the second voice command to the voice acquisition unit 11. For example, the voice capture unit 15 may send the second voice command to the voice acquisition unit 11 by using a far field communication technology or a near field communication technology.

In the present embodiment, after receiving the second voice command output from the voice acquisition unit 11, the identification control unit 12 may perform speech recognition on the second voice command to identify specific content of the second voice command. The identification control unit 12 may compare the second voice command with a voice wake-up template command in the pre-constructed (e.g., prestored in the memory) voice template database to obtain a comparison result. The identification control unit 12 may identify the second voice command as a voice wake-up command, if the comparison result indicates that the second voice command is the same as the voice wake-up template command stored in the voice template database. The identification control unit 12 may further trigger the voice acquisition unit 11 to continue the operation of acquiring a second voice command, if the comparison result indicates that the second voice command is not the same as any voice wake-up template command stored in the voice template database. For example, before identifying the second voice command, the identification control unit 12 may further filter the second voice command to remove interference and extract an eigenvector from the second voice command, to obtain a standard eigenvector. Thereafter, the identification control unit 12 may compare the standard eigenvector with a voice template command stored in the pre-constructed voice template database.

Further, after the identification control unit 12 identifies the first voice command as a voice process command, the voice prompt unit 16 may further output a voice confirmation, such that a user is informed that the first voice command is a valid command according to the voice confirmation.

Further, the identification control unit 12 may further extract voiceprint information from the second voice command acquired by the voice acquisition unit 11 by using a voiceprint recognition technology, compare the extracted voiceprint information with a prestored voiceprint information to obtain a comparison result, and continue to identify the second voice command captured by the voice acquisition unit 11 as a voice wake-up command if the comparison result indicates that the extracted voiceprint information is the same as the prestored voiceprint information. In the present embodiment, if the comparison result from the identification control unit 12 indicates that the extracted voiceprint information is the same as the prestored voiceprint information, it shows that an authentication on a user passes. If the comparison result from the identification control unit 12 indicates that the extracted voiceprint information is not the same as the prestored voiceprint information, it shows that the authentication on the user fails. In this case, the voice prompt unit 16 may output an authentication failure prompt. The prestored voiceprint information may be stored in a pre-constructed voiceprint information template database. The voiceprint information template database may be constructed in the following manner: performing voice training, feature extraction, and model training on a voice output by a user according to a prompt, to construct a voiceprint information model library. During performing voiceprint recognition by using a voiceprint recognition technology, voiceprint recognition may be realized by using a convolutional neural network algorithm, a deep learning algorithm, and/or the like.

Further, the identification control unit 12 may further receive state feedback information sent from the rollable display screen 1, and the state feedback information may include a current rolled state and a current display state of the rollable display screen 1. The identification control unit 12 may further store the current rolled state and the current display state of the rollable display screen 1 in the memory. The rollable display screen 1 may feedback its rolled state and display state to the identification control unit 12 in real time. The latest rolled state feedbacked from the rollable display screen 1 is the current rolled state, and thus the current rolled state may represent the latest rolled state of the rollable display screen 1. The latest display state feedbacked from the rollable display screen 1 is the current display state, and thus the current display state may represent the latest display state of the rollable display screen 1. Upon receiving new state feedback information, the identification control unit 12 may store the received new state feedback information in the memory to replace previously stored state feedback information, so that the state feedback information acquired by the identification control unit 12 from the memory is always the latest state feedback information. In the present embodiment, sine the identification control unit 12 may store the current rolled state and the current display state of the rollable display screen 1 in the memory, the identification control unit 12 may directly read out the current rolled state and the current display state of the rollable display screen 1 upon being triggered by the voice wake-up command, after receiving the voice wake-up command.

In the present embodiment, the rolling operation command may be represented by a state code, and the display drive command may also be represented by another state code. In this way, the state feedback information may be represented by a code obtained by splicing the state code of the rolling operation command and the state code of the display drive command together.

In the present embodiment, the rolling operation command may include a rolling command (e.g., a completely rolling command), a completely expanding command, or a partially expanding command. For example, a state code for the rolling command may be 00, a state code for the completely expanding command may be 01, and a state code for the partially expanding command may be 10. In the present embodiment, the display drive command may include a turn-off command, a turn-on command, or a standby command. For example, a state code for the turn-off command may be 00, a state code for the turn-on command may be 01, and a state code for the standby command may be 10. As such, a state feedback information indicating that the display screen 1 is completely rolled and turned off may be 0000, a state feedback information indicating that the display screen 1 is completely expanded and in the standby state may be 0110, and a state feedback information indicating that the display screen 1 is partially expanded and in the standby state may be 1010, etc.

FIG. 3 is a schematic diagram showing a structural state of the rollable display screen of the display device shown in FIG. 1. As shown in FIG. 3, when the rolling operation command includes the rolling command, the drive control unit 13 may perform a rolling operation on the rollable display screen 1 according to the rolling command, to cause the rollable display screen 1 to be completely located within the accommodation structure 2. Conversely, in the state as shown in FIG. 3 or 4, when the rolling operation command includes the completely expanding command, the drive control unit 13 may perform an expanding operation on the rollable display screen 1 according to the completely expanding command, to cause the rollable display screen 1 to be completely located outside the accommodation structure 1, and in this case, the rollable display screen 1 is in a completely expanded state, as shown in FIG. 1. FIG. 4 is a schematic diagram showing another structural state of the rollable display screen of the display device shown in FIG. 1. As shown in FIG. 4, when the rolling operation command includes the partially expanding command, the drive control unit 13 may perform an expanding operation (from the state shown in FIG. 3) or a rolling operation (from the state shown in FIG. 1) on the rollable display screen 1 according to the partially expanding command, to cause the rollable display screen 1 to be partially located within the accommodation structure 2, and in this case, the rollable display screen 1 is in a partially expanded state.

When the display drive command includes the turn-off command, the display control unit 14 may control the rollable display screen 1 to be turned off according to the turn-off command. Specifically, the turn-off command may be a disabling signal to shut down a power supply of the rollable display screen 1, thereby controlling the rollable display screen 1 to be turned off. When the display drive command includes the turn-on command, the display control unit 14 may causes the rollable display screen 1 to display an image according to the turn-on command, i.e., to perform a normal display. Specifically, the display control unit 14 may provide the rollable display screen 1 with a power supply and a display signal, and the display control unit 14 may light up the rollable display screen 1 according to the turn-on command. That is, the display control unit 14 may provide a power supply to the rollable display screen 1, and output a display signal to the rollable display screen 1, for the display screen to display an image according to the display signal. When the display drive command includes the standby command, the display control unit 14 may cause the rollable display screen 1 to display a standby image according to the standby command, and for example, the standby image may be a black image or a preset fixed image.

In the present embodiment, as described above, the identification control unit 12 may be implemented as a main chip that may include the application processor (AP), the field programmable gate array (FPGA), or a chip developed independently. For example, the main chip may be provided on the mainboard 6, as shown in FIG. 8.

In the present embodiment, the drive control unit 13 may include at least one motor 5, and for example, each motor 5 may be a micro motor or a tubular motor. Further, each motor 5 may determine a rotation direction and a rotation number according to the rolling operation command after receiving the rolling operation command, and drive the rollable display screen 1 to be rolled or to be expanded according to the determined rotation direction and rotation number. Specifically, determining the rotation direction and the rotation number may be based on the current rolled state of the rollable display screen 1. That is, the rotation direction and the rotation number of the rotation shaft 4 may be determined according to the rolling operation command and the current rolled state of the rollable display screen 1. The rotation direction may be the clockwise direction or the counterclockwise direction. For example, the clockwise rotation of the rotation shaft 4 may cause the rollable display screen 1 to be rolled, while the counterclockwise rotation of the rotation shaft 4 may cause the rollable display screen 1 to be expanded. The rotation direction and/or the rotation number of the rotation shaft 4 may result in a rolled degree of the rollable display screen 1, i.e., cause the rollable display screen 1 to be in the completely expanded state, the partially expanded state, or the completely rolled state.

In the display device provided by the present embodiment, the voice acquisition unit may acquire the first voice command, the identification control unit may identify the first voice command captured by the voice capture unit as the voice process command, the drive control unit may perform an operation corresponding to the rolling operation command on the rollable display screen according to the rolling operation command, and the display control unit may control a display state of the rollable display screen according to the display drive command. In the present embodiment, a rolled state and a display state of the rollable display screen is controlled by a voice. Compared with the mechanical control, the user experience of the present embodiment is better, and compared with a fingerprint unlocking method, the display device provided by the present embodiment may include a display screen with any size. Thus, intelligent switching between states of rollable display screens with various sizes may be achieved, thereby increasing the space utilization and the user experience of the rollable display screen, and greatly increasing the value of a rollable display product. A rolled state and a display state of a rollable display screen are controlled by a voice in the present embodiment, which avoids the problem that the face recognition method is highly dependent on the ambient light, avoids the problem that the iris recognition needs a special equipment to enhance the light, and avoids the problem that the fingerprint recognition is easy to forge, must be in contact, and is susceptible to surface oil and sewage stains.

It should be noted that, data and a software program that are used for implement the functions described herein may also be stored in the memory. The software program, when executed by, for example, the AP, enables the AP to implement the functions of the respective components described herein, or to assist the respective components described herein to implement the corresponding functions of the respective components.

FIG. 5 is a schematic flowchart showing a method for controlling a display device according to an embodiment of the present disclosure. As shown in FIG. 5, the display device includes a rollable display screen (e.g., the display device may be the rollable display device according to any one of the foregoing embodiments of the present disclosure), and the method may include the following steps 101 to 104.

In the step 101, a first voice command is acquired.

In the step 102, the acquired first voice command is identified as a voice process command, wherein the voice process command includes the rolling operation command and the display drive command.

In the step 103, an operation corresponding to the rolling operation command is performed on the rollable display screen, according to the rolling operation command.

In the step 104, a display state of the rollable display screen is controlled according to the display drive command.

In the method for controlling a display device according to the present embodiment, the acquired first voice command is identified as the voice process command, an operation corresponding to the rolling operation command is performed on the rollable display screen according to the rolling operation command, and a display state of the rollable display screen is controlled according to the display drive command. In the present embodiment, a rolled state and a display state of the rollable display screen is controlled by a voice. Compared with the mechanical control, the user experience of the present embodiment is better, and compared with a fingerprint unlocking method, the method provided by the present embodiment may be applicable to a display screen with any size. Thus, intelligent switching between states of the rollable display screen with any size may be achieved, thereby increasing the space utilization and the user experience of the rollable display screens, and greatly increasing the value of a rollable display product.

FIG. 6 is a schematic flowchart showing a method for controlling a display device according to an embodiment of the present disclosure, and the display device includes a rollable display screen. As shown in FIG. 6, the method may include the following steps 201 to 213.

In the step 201, a second voice command is acquired.

In the step 202, voiceprint information is extracted from the acquired second voice command by using a voiceprint recognition technology.

When a user needs to use the display device, the user may firstly wake up the display device that is in the standby state. In this case, the user can output the second voice command (which can be a predetermined voice command) having a wake-up function.

In the step 203, the extracted voiceprint information is compared with a prestored voiceprint information to obtain a comparison result. The step 204 is performed if the comparison result indicates that the extracted voiceprint information is the same as the prestored voiceprint information. The step 213 is performed if the comparison indicates that the extracted voiceprint information is not the same as the prestored voiceprint information.

In the step 203, if the comparison result indicates that the extracted voiceprint information is the same as the prestored voiceprint information, it shows that an authentication on the user passes; if the comparison result indicates that the extracted voiceprint information is not the same as the prestored voiceprint information, it shows that the authentication on the user fails.

In the step 204, the acquired second voice command is identified as a voice wake-up command.

In the step 205, the current rolled state and the current display state of the rollable display screen are read out according to the voice wake-up command.

In the step 206, a voice prompt is output according to the read current rolled state and the read current display state of the rollable display screen, for the user to output a first voice command according to the voice prompt.

In the step 207, the first voice command is acquired.

In the step 208, the acquired first voice command is identified as a voice process command, wherein the voice process command includes the rolling operation command and the display drive command.

In the present embodiment, the rolling operation command may include a rolling command (e.g., completely rolling command), a completely expanding command, or a partially expanding command.

In the present embodiment, the display drive command may include a turn-off command, a turn-on command, or a standby command.

In the step 209, an operation corresponding to the rolling operation command is performed on the rollable display screen, according to the rolling operation command.

In the step 210, a display state of the rollable display screen is controlled according to the display drive command.

In the step 211, state feedback information sent from the rollable display screen is received, wherein the state feedback information may include the current rolled state and the current display state of the rollable display screen.

In the step 212, the current rolled state and the current display state of the rollable display screen are stored. At this time, the method flow may end.

In the step 213, an authentication failure prompt is output. At this time, the method flow may end.

In the present embodiment, the authentication failure prompt is to inform the user that the authentication on the user fails.

The steps 207 to 210 shown in FIG. 6 may be the same as the steps 101 to 104 shown in FIG. 5, respectively. That is, the method shown in FIG. 6 may include the method shown in FIG. 5.

In the method for controlling a display device according to the present embodiment, the acquire first voice command is identified as the voice process command, an operation corresponding to the rolling operation command is performed on the rollable display screen according to the rolling operation command, and a display state of the rollable display screen is controlled according to the display drive command. In the present embodiment, a rolled state and a display state of the rollable display screen is controlled by a voice. Compared with the mechanical control, the user experience of the present embodiment is better, and compared with a fingerprint unlocking method, the method provided by the present embodiment may be applicable to a display screen with any size. Thus, intelligent switching between states of the rollable display screen with any size may be achieved, thereby increasing the space utilization and the user experience of the rollable display screen, and greatly increasing the value of a rollable display product. Further, the control method of the present embodiment may also perform an authentication on a user, thereby preventing an unauthorized user from using the display device.

The foregoing embodiments of the present disclosure may be combined with each other in a case where there is no explicit conflict.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A display device comprising a rollable display screen, a voice acquisition unit, an identification control unit, a drive control unit, and a display control unit, wherein
the voice acquisition unit is configured to acquire a first voice command;
the identification control unit is configured to identify the first voice command acquired by the voice acquisition unit as a voice process command, and the voice process command comprises a rolling operation command and a display drive command;
the drive control unit is configured to perform an operation corresponding to the rolling operation command on the rollable display screen according to the rolling operation command; and
the display control unit is configured to control a display state of the rollable display screen according to the display drive command,
wherein the display device further comprises an accommodation structure and a fixing bar, one end of the rollable display screen is within the accommodation structure, an other end, which is opposite to the one end, of the rollable display screen is outside the accommodation structure and connected to the fixing bar, and the fixing bar is configured to prevent the other end of the rollable display screen from being completely located within the accommodation structure, and
wherein the identification control unit is further configured to receive state feedback information sent from the rollable display screen, the state feedback information comprises a current rolled state and a current display state of the rollable display screen, and the identification control unit is further configured to store the current rolled state and the current display state of the rollable display screen in a memory.

2. The display device according to claim 1, further comprising a voice prompt unit, wherein
the voice acquisition unit is further configured to acquire a second voice command;
the identification control unit is further configured to identify the second voice command acquired by the voice acquisition unit as a voice wake-up command, and read the current rolled state and the current display state of the rollable display screen according to the voice wake-up command; and
the voice prompt unit is configured to output a voice prompt according to the read current rolled state and the read current display state of the rollable display screen, for a user outputting the first voice command according to the voice prompt.

3. The display device according to claim 2, wherein the identification control unit is further configured to extract voiceprint information from the second voice command acquired by the voice acquisition unit by using a voiceprint recognition technology, compare the extracted voiceprint information with a prestored voiceprint information to obtain a comparison result, and identify the second voice command acquired by the voice acquisition unit as the voice wake-up command if the comparison result indicates that the extracted voiceprint information is the same as the prestored voiceprint information.

4. The display device according to claim 2, further comprising
a voice capture unit configured to capture the second voice command and send the second voice command to the voice acquisition unit.

5. The display device according to claim 2, wherein the voice acquisition unit is configured to acquire the second voice command from the voice capture unit, and the voice capture unit is located in a terminal device.

6. The display device according to claim 1, wherein the display drive command comprises a turn-off command, a turn-on command, or a standby command.

7. The display device according to claim 1, further comprising
a voice capture unit configured to capture the first voice command and send the first voice command to the voice acquisition unit.

8. The display device according to claim 7, further comprising an accommodation structure, and the voice capture unit is located on a bottom or an outer side wall of the accommodation structure.

9. The display device according to claim 1, wherein the rolling operation command comprises a completely rolling command, a completely expanding command or a partially expanding command.

10. The display device according to claim 1, wherein the voice acquisition unit is configured to acquire the first voice command from the voice capture unit, and the voice capture unit is located in a terminal device.

11. The display device according to claim 1, further comprising a voice prompt unit configured to, after the identification control unit identifies the first voice command as the voice process command, output a voice confirmation, such that a user is informed that the first voice command is a valid command according to the voice confirmation.

12. The display device according to claim 1, further comprising an accommodation structure, and the identification control unit, the drive control unit and the display control unit are located within the accommodation structure.

13. A method for controlling a display device, the display device comprising a rollable display screen, and the method comprising
- a step S01 of acquiring a first voice command;
- a step S02 of identifying the acquired first voice command as a voice process command, wherein the voice process command comprises a rolling operation command and a display drive command;
- a step S03 of performing an operation corresponding to the rolling operation command on the rollable display screen according to the rolling operation command; and
- a step S04 of controlling a display state of the rollable display screen according to the display drive command,
- wherein the display device further comprises an accommodation structure and a fixing bar, one end of the rollable display screen is within the accommodation structure, an other end, which is opposite to the one end, of the rollable display screen is outside the accommodation structure and connected to the fixing bar, and the fixing bar is configured to prevent the other end of the rollable display screen from being completely located within the accommodation structure,
- the method further comprises: an information receiving step of receiving state feedback information sent from the rollable display screen, wherein the state feedback information comprises a current rolled state and a current display state of the rollable display screen, and wherein the information receiving step is after the step 04; and
- the method further comprises: an information storing step of storing the current rolled state and the current display state of the rollable display screen.

14. The method according to claim 13, further comprising
- a step S05 of acquiring a second voice command; and
- a step S06 of extracting voiceprint information from the acquired second voice command by using a voiceprint recognition technology;
- wherein the step S05 and the step S06 are prior to the step S01.

15. The method according to claim 14, further comprising
- a step S07 of comparing the extracted voiceprint information with a prestored voiceprint information to obtain a comparison result; and
- a step S08 of outputting an authentication failure prompt if the comparison result indicates that the extracted voiceprint information is not the same as the prestored voiceprint information.

16. The method according to claim 15, further comprising a step S09 of identifying the acquired second voice command as a voice wake-up command if the comparison result indicates that the extracted voiceprint information is the same as the prestored voiceprint information.

17. The method according to claim 16, further comprising step S10 of reading a current rolled state and a current display state of the rollable display screen according to the voice wake-up command.

18. The method according to claim 17, further comprising a step S11 of outputting a voice prompt according to the current rolled state and the current display state of the rollable display screen, for a user outputting the first voice command according to the voice prompt.

* * * * *